April 26, 1938.   M. REDLINGER   2,115,085
ROTARY BIN
Filed July 1, 1935   2 Sheets-Sheet 1
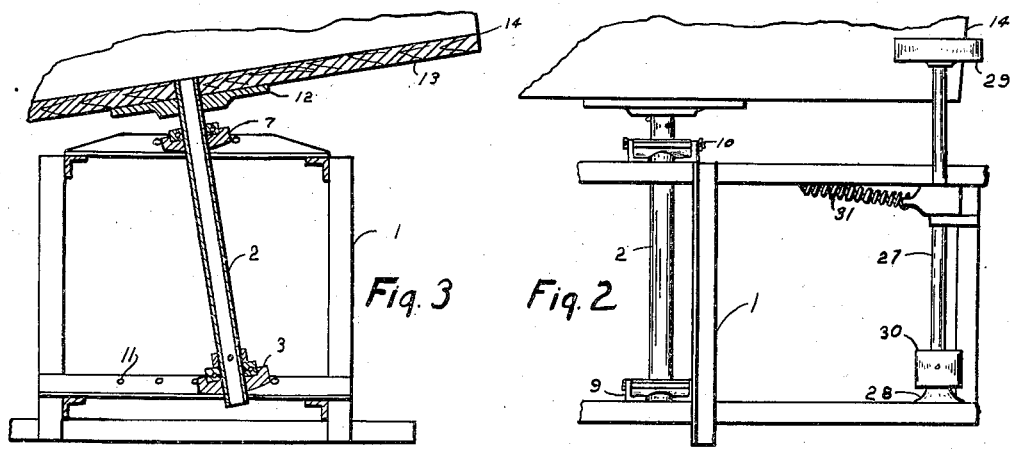
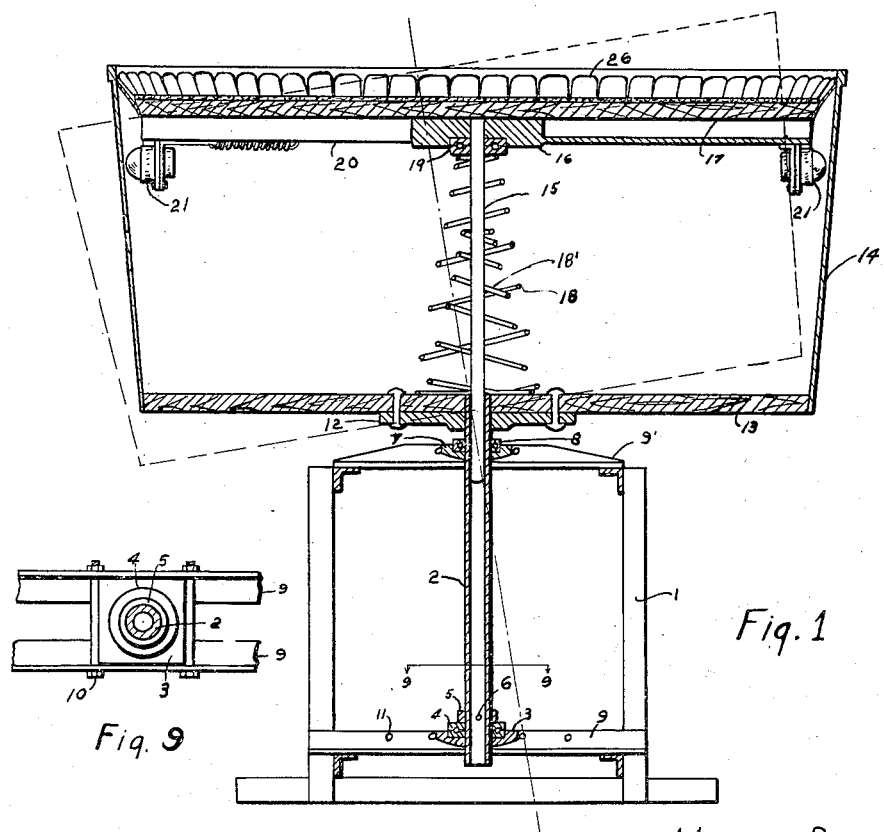
MICHAEL REDLINGER
INVENTOR
ATTORNEY April 26, 1938.  M. REDLINGER  2,115,085

ROTARY BIN

Filed July 1, 1935  2 Sheets-Sheet 2

MICHAEL REDLINGER
INVENTOR
BY
ATTORNEY

Patented Apr. 26, 1938

2,115,085

UNITED STATES PATENT OFFICE 2,115,085

ROTARY BIN

Michael Redlinger, Portland, Oreg.

Application July 1, 1935, Serial No. 29,307

14 Claims. (Cl. 226—129)

This invention relates to improvements in rotary bins, and has particular reference to novel means for operating said bins to distribute fruit to be packed for shipment.

The subject matter of the invention pertains to certain modifications and improvements in the construction of rotatable fruit dispensing bins of the type which ordinarily include a rotatable bin and a rotatable tray concentric therewith, the tray being arranged for axial movement within the bin and responsive to the weight of fruit or other articles deposited thereon.

Heretofore rotary bins have had their fruit receiving trays disposed in a horizontal plane for rotation about a vertical axis, for the reason that if one side of the bin filled more rapidly than another the uneven distribution of weight upon the tray would cause binding of the supporting bearings or other parts so as to prevent depression of the tray. The maintenance of the bins in a horizontal plane has made necessary the provision of delivery ramps or other fruit delivery means intermediate the grading apparatus and the bin to insure safe delivery of the fruit to the bin. Moreover, in these structures, the bin bottom or tray and the bin proper have been arranged for unitary rotative movement, and the rotation of the tray has been conjoint with the rotation of the entire bin structure.

An important feature of the present invention resides in the provision of an adjustable mechanism for tilting the bin so as to position the fruit receiving tray on an angle to the horizontal. By utilizing such construction the bin may be tilted sufficiently to permit fruit to be discharged from a grading apparatus directly into the bin without damage to the fruit, and without the interposition of additional fruit handling equipment, while at the same time presenting the fruit within convenient reach of the packers. Moreover, the present invention utilizes mechanism adapted to prevent binding of supporting bearings or other parts in the event of uneven distribution of weight upon the tray so as to permit unhampered axial movement of the tray within the bin. A further characteristic of the present invention resides in the fact that the tray is rotatable independently of the rotation of the bin. It often happens, in grading a quantity of fruit, that the proportions delivered to the several bins will vary from time to time, as one size or another preponderates. In apparatus embodying the present invention the driving force may be diverted from bins which receive small amounts of fruit, the tray alone being rotatable under the impetus of small amounts of fruit delivered thereto to pass the fruit before the packers.

It is, therefore, a primary object of the invention to provide apparatus which will greatly facilitate the delivery of fruit to be packed for shipment.

A further object of the invention is to provide mechanism which will permit relative rotation of a rotary bin and the fruit receiving tray therewithin.

A further object of the invention is to provide mechanism for operatively positioning a rotary bin on an angle to the horizontal.

A further object of the invention is to provide apparatus of the character described which will prevent abrading or pinching of fruit delivered thereto.

A further object of the invention is to provide apparatus of the character described which is simple, compact and sturdy in design, and which is inexpensive to build and operate.

Additional objects and advantages will become apparent as the description proceeds in connection with the accompanying drawings, it being understood that the drawings are illustrative only and that various changes and modifications may be resorted to without departing from the spirit or scope of the invention; and I deem myself entitled to all such changes and modifications as fall within the scope of the claims hereto appended.

In the drawings:

Figure 1 is a vertical cross section of an apparatus embodying my invention, including a representation of the bin disposed at an angle to the horizontal.

Figure 2 is a fragmentary side elevation of the supporting framework illustrating the tilting mechanism and the mechanism for driving the bin.

Figure 3 is a sectional end elevation of the supporting framework, particularly emphasizing the construction of the tilting mechanism.

Figure 9 is a sectional detail, taken along the line 9—9 of Figure 1.

Figures 6, 7, 8:
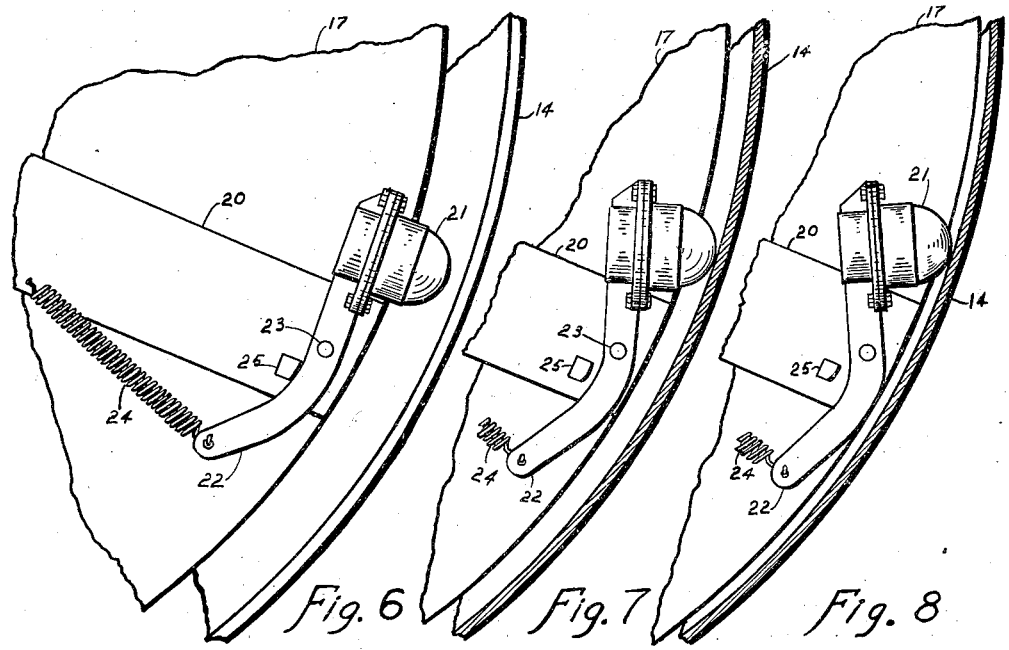
Figure 6 is a fragmentary view of the bottom of the tray, illustrating the position of the tray centering means when the tray is at the top of the bin.
Figure 7 is the same as Figure 6, except that the tray has been depressed to approximately midway of the bin.
Figure 8 illustrates the position of the tray centering means when the tray is completely depressed to the bottom of the bin.
Figure 4:
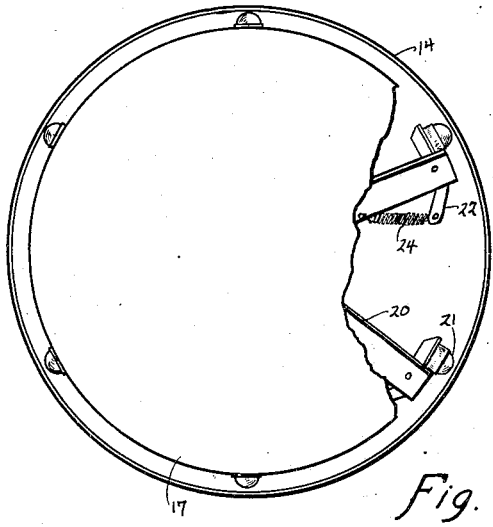
Figure 4 is a top plan view of the device illustrated in Figure 1, certain portions being omitted or broken away to illustrate the tray centering means.
Figure 5:
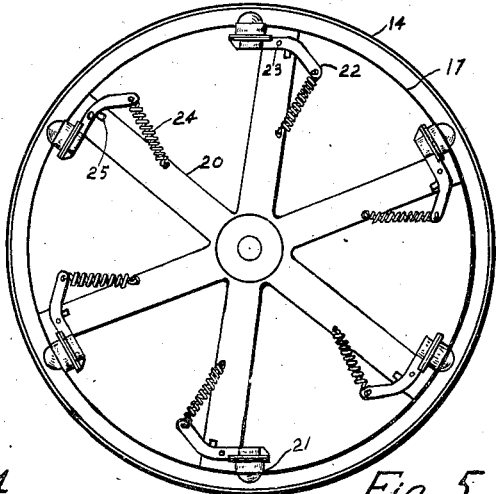
Figure 5 is a bottom plan view of the rotatable tray in normal position at the top of the bin.

The structure thus illustrated comprises a supporting frame 1, an upwardly projecting hollow shaft 2, rotatably supported upon the frame 1 by means of a hub 3, a thrust bearing 4, and a collar 5, the collar being pinned to the shaft at 6. A second hub 7 is disposed about said shaft 2 at the top of said frame 1, and an anti-friction bearing 8 is recessed therein to carry the side thrust of said shaft 2.

As best illustrated in Figures 2 and 9, each of the hubs 3 and 7 is rockably supported upon the horizontal flanges of angle iron cross members 9 and 9', respectively, secured to the frame 1. Bolts 10 are disposed transversely through the upstanding flanges of said angle iron members 9 and 9' to maintain said hubs in place. Referring to Figures 1 and 3, it will be noted that the cross members 9 at the base of the frame 1 are provided with a plurality of holes 11 for the reception of the bolts 10. This is to permit lateral placement of the hub 3 and associated bearing 4 to incline the shaft 2 at an angle to the vertical, the hub 7 at the top of the frame rocking to one side, as in Figure 3, without lateral movement. By this expedient, the bin may be tilted to either side, as desired, to position its working plane at an angle to the horizontal, as illustrated in broken lines in Figure 1.

Affixed to the shaft 2, so as to be rotatable therewith, is a seat 12, upon which rests a circular bin comprising a horizontal circular frame 13 and a peripheral wall 14, said wall being tapered whereby the lower portion of said bin is of less diameter than its upper portion. Telescopically engaging the shaft 2, so as to be slidably and rotatably movable therewithin, is a rotatable shaft 15 disposed concentrically of said bin. The upper end of the shaft 15 supports a seat 16 upon which rests a rotatable tray 17 which forms the bin bottom. In order to insure that the contents of the bin will not overflow in case fruit is deposited therein faster than it is removed therefrom, and also for the purpose of presenting the fruit at a constant level, the bin bottom 17 is vertically yieldable. This is accomplished by means of a helical compression spring 18 surrounding the shaft 15 and bearing on the circular frame 13 to form a yieldable support for an anti-friction bearing 19 recessed in the seat 16. The lower half of the raceway for this bearing receives the upper end of the helical spring 18 and is intended to remain stationary, whereas the upper half of the raceway is recessed in the seat member 16 and is rotatable therewith.

Extending radially from the seat 16 to the outer edges of the tray 17 is a spider 20, at the outer ends of which are disposed a plurality of rollable members 21. These are secured to lever arms 22, each of which are fulcrumed as at 23, and the rollable members 21 maintained in position to exert pressure against the wall 14 of the bin by means of a spring 24 secured to the spider arm 20 and having its opposite end attached to the lever arm 22. A stop 25 is provided for engagement with the inner edge of each lever arm 22 to limit its movement and to maintain the rollable members 21 a uniform distance from the periphery of the bin bottom 17 so as to center said bottom with relation to the wall 14. It will be noted that the resilient support for the bin bottom, as well as mechanism insuring its rotation relative to said bin, is disposed entirely therebeneath, without any post or projection of any kind above the tray or bin bottom to hinder the packer when he reaches for fruit upon the tray.

Arranged peripherally of the bin bottom 17 are closely spaced, flexible fingers 26. These are secured to the inversely beveled edge of the bin bottom and serve as an extension of the bottom to prevent fruit being pinched between the bottom and the wall of the bin.

It will be noted that when the bin is empty the tray or bin bottom is maintained at the top of the bin, and when in this position the only contact between the bin bottom and the wall 14 is by means of the flexible fingers 26, which prevent fruit from passing between the bottom and the wall. In this position the bottom is freely rotatable, it being mounted solely upon the anti-friction bearing 19 recessed in the seat 16 at the top of the spring 18. When sufficient fruit is deposited in the bin so as to depress the bottom, the rollable members 21 engage the walls 14 of the bin, due to their tapered construction, and maintain the bottom in uniformly spaced relation to said wall and concentric therewith. In Figures 6, 7, and 8 of the drawings is illustrated the relative positions of the bin bottom and wall, and the manner of operation of the spring controlled centering device when the bin bottom is disposed at the top of the bin (Figure 6); or is depressed to approximately midway of the bin (Figure 7); or is under full load at the bottom of the bin (Figure 8). By this construction, inequalities in the distribution of weight on the tray or bin bottom do not interfere either with the axial movement of the bottom or with its rotation.

In Figure 1 is illustrated an auxiliary compression spring 18' positioned within and concentrically of the spring 18 and also surrounding the shaft 15. This spring, which is of shorter length than the spring 18, is intended to operatively engage the bin bottom 17 to increase the resistance exerted by the bin bottom against the weight of articles deposited thereon when said bottom shall have been depressed a predetermined extent.

The purpose of the tapered wall is to prevent abrading of the fruit by rolling or crushing it between the bin bottom 17 and the wall 14 as the bottom rises when fruit is removed from the bin. It has been found that in the operation of bins of uniform diameter the upward movement of the bin bottom, combined with the pressure of the fruit in the bin, causes those pieces of fruit next to the bin wall to be skidded upwardly along the wall so as to materially damage them. Applicant has discovered that by tapering the wall of the bin so as to progressively enlarge its diameter toward the top, the bin wall recedes from those pieces of fruit next to the wall as the bin bottom is forced upwardly, so as to materially reduce friction between the wall and the fruit. Moreover, as the bin bottom is depressed and the intervening space between the periphery of the bottom and the wall is correspondingly lessened, the flexible fingers 26 tend to creep upwardly along the wall to keep the fruit away from the point of contact between the bin bottom and the wall, so that crushing of fruit at this point is prevented.

The driving mechanism for rotating the bin includes a vertical shaft 27 rotatably journalled in bearings 28 in the framework 1 and projecting upwardly to a point contiguous to the outer periphery of the bin wall 14. Disposed at the top of said shaft is a friction wheel 29 for engaging the peripheral wall of the bin. Power to rotate the bin may be transmitted from any suitable source to the pulley 30, the driven friction wheel 29 being held in operative engagement with the bin wall by means of the tension spring 31.

In operation, the structure disclosed may be inclined so as to present its working plane at an angle to the horizontal. This is accomplished by moving the hub 3 laterally of the framework 1, thus disposing the hub 7 at an angle to support its load on one of its rounded faces. Fruit is delivered to the bin in any desirable manner, it being intended, however, that the higher edge of the tilted bin may be placed in juxtaposition to the delivery ramp of a fruit grader so as to permit the fruit to be delivered directly to the bin from the grading apparatus without the interposition of additional fruit handling apparatus.

The fact that the tray or bin bottom is mounted for rotation independently of the bin wall has the advantage that the packers may, if desired, hasten or retard the rotation of the tray without interrupting rotation of the bin, as may prove desirable when but a small amount of fruit is being delivered to a particular bin. Moreover, in such case, the driving force for rotating the bin may be diverted to other uses, the freely floating tray being rotatable under the impetus of small amounts of fruit delivered thereto to pass such fruit before the packers.

Having now described my invention and in what manner the same may be used, what I claim as new and desire to protect by Letters Patent is:

1. A rotatable bin having a depressible bottom and a peripheral tapered wall concentric therewith, whereby the lower portion of the bin is of less diameter than its upper portion, means mounting said bottom for axial movement within said bin, and a plurality of flexible tabs arranged peripherally of said bottom and designed to lie against said peripheral wall.

2. A rotatable bin having a depressible bottom and a peripheral wall concentric therewith, means mounting said bottom for axial movement within said bin, and spring controlled means to maintain said bottom in horizontally spaced relation to said wall.

3. A rotatable bin having a depressible bottom and a peripheral wall, means mounting said bottom for axial movement within said bin, and spring controlled rollable means to maintain the bottom in spaced relation to said wall and concentric therewith.

4. A rotatable bin having a depressible bottom and a peripheral, tapered wall, whereby the lower portion of said bin is of less diameter than its upper portion, means mounting said bottom for axial movement within said bin, and flexible means arranged peripherally of said bottom to form an extension of said bottom to said wall.

5. A rotatable bin having a depressible bottom and a peripheral wall concentric therewith, resilient means mounting said bottom for axial movement within said bin, said means including auxiliary means to increase the resistance exerted by said bottom in proportion to the weight of articles deposited thereon.

6. A rotatable bin having a peripheral wall, a hollow vertical shaft for supporting said bin, a tray disposed within said bin and concentric with said wall, a shaft for supporting said tray, said tray supporting shaft slidably and rotatably engaging said first named shaft.

7. A rotatable bin having a peripheral wall, a tray disposed within said bin and concentric with said wall, means mounting said tray for axial movement within said bin, and rollable means disposed peripherally of said tray for engaging the wall of said bin as the tray is depressed to maintain the tray in uniformly spaced relation to the wall.

8. A rotatable bin having a peripheral wall, a tray disposed within said bin and concentric with said wall, a resilient support for said tray positioned therebeneath, and an anti-friction bearing disposed between said support and said tray.

9. A rotatable bin having a peripheral wall, a tray disposed within said bin and concentric with said wall, and resilient means rotatably supporting said tray, said tray rotatably engaging said means for rotation independently of the rotation of said bin.

10. In an apparatus of the character described, a frame, a circular bin, a vertical shaft for supporting said bin rotatably supported upon said frame, a pair of spaced hubs for said shaft, one of said hubs being movable laterally of said frame to incline said shaft at an angle to the vertical so as to position said bin with its working plane at an angle to the horizontal.

11. In an apparatus of the character described, a frame, a circular bin, a vertical shaft for supporting said bin, spaced bearings rotatably supporting said shaft, one of said bearings being movable laterally of said frame to incline said shaft at an angle to the vertical so as to position said bin with its working plane at an angle to the horizontal.

12. An apparatus of the character described, comprising a frame, a circular bin, a hollow shaft rotatably mounting said frame for supporting said bin, a second shaft slidably and rotatably engaging said first named shaft, a circular tray disposed within said bin and secured to said second named shaft, a resilient support for said tray positioned therebeneath, and an anti-friction bearing disposed between said support and said tray.

13. An apparatus of the character described, comprising a frame, a circular bin, a hollow shaft rotatably supporting said bin, a second shaft slidably and rotatably engaging said first named shaft, a circular tray disposed within said bin and secured to said second named shaft, and resilient means rotatably supporting said tray within said bin.

14. A rotatable bin having a peripheral wall, a tray disposed within said bin and concentric with said wall, means mounting said tray for axial movement within said bin, said tray rotatably engaging said means for rotation independently of the rotation of said bin.

MICHAEL REDLINGER.